United States Patent
Searles et al.

(10) Patent No.: US 7,872,937 B2
(45) Date of Patent: Jan. 18, 2011

(54) DATA DRIVER CIRCUIT FOR A DYNAMIC RANDOM ACCESS MEMORY (DRAM) CONTROLLER OR THE LIKE AND METHOD THEREFOR

(75) Inventors: Shawn Searles, Austin, TX (US); Faisal A. Syed, Austin, TX (US); Nicholas T. Humphries, Austin, TX (US)

(73) Assignee: Globalfoundries Inc.

( * ) Notice: Subject to any disclaimer, the term of this patent is extended or adjusted under 35 U.S.C. 154(b) by 266 days.

(21) Appl. No.: 12/059,641

(22) Filed: Mar. 31, 2008

(65) Prior Publication Data

US 2009/0245010 A1    Oct. 1, 2009

(51) Int. Cl.
   *G11C 8/00* (2006.01)
(52) U.S. Cl. ............... 365/230.06; 365/191; 365/193; 365/230.08; 365/233.1
(58) Field of Classification Search ................ 365/233, 365/193, 191, 230.06, 230.08
   See application file for complete search history.

(56) References Cited

U.S. PATENT DOCUMENTS

| | | | |
|---|---|---|---|
| 5,373,255 A | 12/1994 | Bray et al. | |
| 5,440,515 A | 8/1995 | Chang et al. | |
| 5,857,095 A | 1/1999 | Jeddeloh et al. | |
| 6,691,214 B1 | 2/2004 | Li et al. | |
| 6,791,889 B2 * | 9/2004 | Peterson | 365/193 |
| 6,930,932 B2 | 8/2005 | Rentschler | |
| 7,038,971 B2 | 5/2006 | Chung | |
| 7,061,941 B1 * | 6/2006 | Zheng | 370/535 |
| 7,117,381 B2 | 10/2006 | Kim et al. | |
| 7,184,323 B2 * | 2/2007 | Fujisawa | 365/189.05 |
| 7,321,525 B2 | 1/2008 | Matsui | |
| 7,457,174 B2 | 11/2008 | Braun et al. | |
| 7,487,378 B2 | 2/2009 | Morein et al. | |
| 7,518,946 B2 | 4/2009 | Iwasaki | |
| 2002/0147892 A1 | 10/2002 | Rentschler et al. | |

(Continued)

FOREIGN PATENT DOCUMENTS

WO   2008/063199 A1   5/2008

OTHER PUBLICATIONS

International Search Report in application No. PCT/US2009/003220 mailed Sep. 15, 2009, 12 pages.

(Continued)

*Primary Examiner*—Pho M Luu
*Assistant Examiner*—Tha-O Bui (57) ABSTRACT

A data driver includes a first latch (322), an extension logic circuit (324), and a second latch (330). The first latch (322) has an input for receiving an input data signal, a clock input for receiving a first clock signal, and an output. The extension logic circuit (324) has an input coupled to the output of the first latch (322), a control input for receiving a control signal, and an output. The extension logic circuit (324) selectively delays the output of the first latch (322) in response to the control signal. The second latch (330) has an input coupled to the output of the extension logic circuit (324), a clock input for receiving a second clock signal, and an output for providing an output data signal.

20 Claims, 3 Drawing Sheets

U.S. PATENT DOCUMENTS

| | | | |
|---|---|---|---|
| 2002/0147896 A1* | 10/2002 | Rentschler et al. | 711/167 |
| 2003/0021164 A1 | 1/2003 | Yoo et al. | |
| 2004/0143775 A1* | 7/2004 | Li et al. | 713/401 |
| 2005/0197082 A1 | 9/2005 | Agostinelli | |
| 2005/0204245 A1* | 9/2005 | Lee et al. | 714/744 |
| 2005/0243608 A1* | 11/2005 | Lee | 365/189.01 |
| 2006/0114742 A1 | 6/2006 | Salmont et al. | |
| 2006/0133158 A1* | 6/2006 | Shin | 365/189.05 |
| 2006/0262613 A1 | 11/2006 | Braun et al. | |
| 2007/0217559 A1 | 9/2007 | Stott et al. | |
| 2009/0086562 A1* | 4/2009 | Richards | 365/230.06 |
| 2009/0244995 A1 | 10/2009 | Searles et al. | |
| 2009/0244996 A1 | 10/2009 | Searles et al. | |
| 2009/0244997 A1 | 10/2009 | Searles et al. | |
| 2009/0296501 A1 | 12/2009 | Searles | |

OTHER PUBLICATIONS

"Double Data Rate (DDR) SDRAM Specification," JESD79, Release 2, JEDEC Solid State Technology Association, JEDEC Standard, Electronics Industries Alliance, May 2002.

U.S. Appl. No. 12/059,613, Office Action mailed Apr. 7, 2010, 6 pages.

U.S. Appl. No. 12/059,593, Notice of Allowance mailed Apr. 9, 2010, 8 pages.

U.S. Appl. No. 12/059,653, Notice of Allowance mailed Apr. 29, 2010, 14 pages.

U.S. Appl. No. 12/059,653 Notice of Allowance mailed Aug. 10, 2010, 11 pages.

U.S. Appl. No. 12/059,593 Notice of Allowance mailed Jul. 23, 2010, 8 pages.

U.S. Appl. No. 12/127,059 Non-Final Office Action mailed Sep. 2, 2010, 8 pages.

U.S. Appl. No. 12/059,613 Final Office Action mailed Jul. 27, 2010, 9 pages.

* cited by examiner

DATA DRIVER CIRCUIT FOR A DYNAMIC RANDOM ACCESS MEMORY (DRAM) CONTROLLER OR THE LIKE AND METHOD THEREFOR

CROSS REFERENCE TO RELATED APPLICATIONS

Related subject matter is contained in the following copending applications:

Application Ser. No. 12/059,613, filed Mar. 31, 2008, entitled "CIRCUIT USING A SHARED DELAY LOCKED LOOP (DLL) AND METHOD THEREFOR" invented by Shawn Searles, Nicholas T. Humphries, and Faisal A. Syed and assigned to the assignee hereof.

Application Ser. No. 12/059,593, filed Mar. 31, 2008, entitled "CIRCUIT FOR LOCKING A DELAY LOCKED LOOP (DLL) AND METHOD THEREFOR" invented by Shawn Searles, Nicholas T. Humphries, and Faisal A. Syed and assigned to the assignee hereof.

Application Ser. No. 12/059,653, filed Mar. 31, 2008, entitled "METHOD FOR TRAINING DYNAMIC RANDOM ACCESS MEMORY CONTROLLER TIMING DELAYS" invented by Shawn Searles, Tahsin Askar; and Thomas Hamilton, and Oswin Housty, and Faisal A. Syed and assigned to the assignee hereof.

Application Ser. No. 12/127,059, filed May 27, 2008, entitled "METHOD AND APPARATUS FOR IMPLEMENTING WRITE LEVELIZATION IN MEMORY SUBSYSTEMS" invented By Shawn Searles et al. and assigned to the assignee hereof.

FIELD OF THE DISCLOSURE

The invention relates generally to interface circuits, and more particularly to interface circuits that use data drivers.

BACKGROUND

A data processing system includes a central processing unit (CPU) that executes instructions and thereby manipulates data. The instructions and data are stored in a memory system, which is typically isolated from the CPU. The CPU interacts with the memory system through a memory interface. The functioning of the memory interface is predominantly under the control of the CPU, and is typically performed by a memory controller. The memory controller can be integrated tightly with the CPU, such as on the same silicon chip as the CPU, or it can be included with other components of the data processing system, one such component often referred to as a north-bridge chip.

There are many types of memory. One type is referred to as dynamic random access memory (DRAM). A DRAM system can include several known types of DRAM, of which double data rate (DDR) is an example. One may refer to the memory controller that governs the interface to the DRAM system as a DRAM controller. Furthermore, one may refer to a memory controller that interfaces a CPU to DDR DRAM as a DDR DRAM controller.

DDR DRAM conforms to industry standard electrical and protocol standards set forth by the Joint Electron Devices Engineering Councils (JEDEC). These standards define how the contents of the DRAM are accessed (read), and stored (written). The original DDR standard has recently been enhanced to include standards known as DDR2 and DDR3.

The interface to any of these DDR DRAMs is accomplished primarily through two signal classes, DQ (data) and DQS (data strobe).

The JEDEC standard interface specifies that during a read operation, the DDR DRAM will issue these two signal classes at the same time, a manner commonly referred to as "edge aligned". In order for the DRAM controller to correctly acquire the data being sent from the DDR DRAM, the DRAM controller typically utilizes a delay-locked loop (DLL) circuit to delay the DQS signal so that it can be used to correctly latch the DQ signals. Topological and electrical difference between DQ, DQS, MEMCLK, and ADDR/CMD interconnects result in timing skew between these signals, making it difficult to establish a proper delay for the DLL.

The DRAM controller is always responsible for driving the main memory clock, designated "MEMCLK", as well as address and command signals to the memory. Thus during write cycles, the DRAM controller must drive DQ, DQS, and MEMCLK with the proper timing relative to one another. During write cycles, the DDR standard requires that transitions in DQS must be approximately synchronous with transitions in MEMCLK, and transitions in DQ must be centered around transitions in DQS (not edge aligned).

Moreover, memory chips now operate at far higher speeds than the speeds of the original DDR DRAMs. These speeds are now so high that signal propagation delays between the DRAM controller and the memory chips can exceed one MEMCLK cycle. In addition, signal routing used by DDR2 and DDR3 dual in-line memory modules (DIMMs) adds additional skews between these signals. Specifically, DDR3 DIMMs commonly route the MEMCLK and address and command signals to all DRAM chips on a DIMM in sequence using a "fly-by" technique, while at the same time they route the DQ and DQS signals directly to the corresponding memory chip.

All these constraints make it difficult for DRAM controllers to launch the DQ, DQS, and MEMCLK signals so that they arrive at the memory chips on the DIMM with proper timing.

BRIEF SUMMARY

In one form, a dynamic random access memory (DRAM) controller with a data driver circuit includes a first latch, an extension logic circuit, and a second latch. The first latch has an input for receiving a processor data signal, a clock input for receiving a processor clock signal, and an output. The extension logic circuit has an input coupled to the output of the first latch, a control input for receiving a control signal, and an output. The extension logic circuit delays the input selectively in response to the control signal. The second latch has an input coupled to the output of the extension logic circuit, a clock input for receiving a second clock signal, and an output for providing an output signal.

In another form, a data driver includes a first latch, an extension logic circuit, and a second latch. The first latch has an input for receiving an input data signal, a clock input for receiving a first clock signal, and an output. The extension logic circuit has an input coupled to the output of the first latch, a control input for receiving a control signal, and an output. The extension logic circuit selectively delays the output of the first latch in response to the control signal. The second latch has an input coupled to the output of the extension logic circuit, a clock input for receiving a second clock signal, and an output for providing an output data signal.

In yet another form, data is latched in response to a first clock. The latched data is selectively delayed in response to a control signal. The selectively delayed data is re-latched in response to a second clock signal.

BRIEF DESCRIPTION OF THE DRAWINGS

The present disclosure may be better understood, and its numerous features and advantages made apparent to those skilled in the art by referencing the accompanying drawing, in which like reference numbers indicate similar or identical items, and in which.

DETAILED DESCRIPTION

Figure 1:
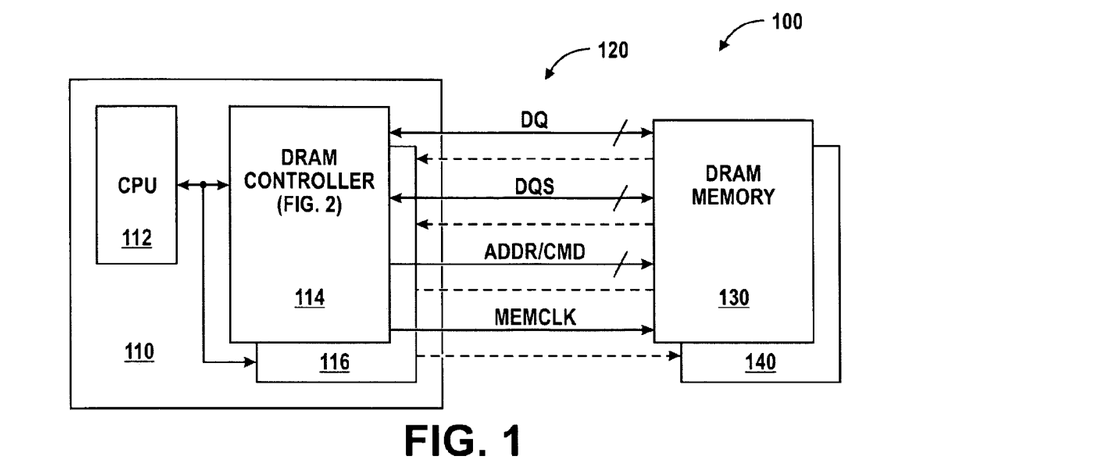
FIG. 1 illustrates in block diagram form a data processing system according to the present invention.

FIG. 1 illustrates in block diagram form a data processing system 100 according to the present invention. Data processing system 100 includes generally a microprocessor 110, a memory interface 120, and memories 130 and 140. Microprocessor 110 includes generally a central processing unit (CPU) 112, and dynamic random access memory (DRAM) controllers 114 and 116. CPU 112 has a bidirectional interface to DRAM controllers 114 and 116 for conducting address, data, and control signals. DRAM controllers 114 and 116 are also connected to memory interface 120 and each has an input/output terminal for conducting a memory data signal labeled "DQ", an input/output terminal for conducting a memory data strobe signal labeled "DQS", an output terminal for providing address and command information labeled "ADD/CMD", and an output terminal for providing a memory clock signal labeled "MEMCLK". Memory devices 130 and 140 are connected to microprocessor 110 via memory interface 120, and each has an input/output terminal for conducting DQ, an input/output terminal for conducting DQS, an input terminal for receiving ADD/CMD, and an input terminal for receiving MEMCLK. While the following discussion references only DRAM controller 114 and memory 130, it should be appreciated that DRAM controller 116 and memory 140 are interconnected over memory interface 120 and operate in the same way, and a data processing system can include any number of DRAM controllers and corresponding memories consistent with the principles set forth herein.

Microprocessor 110 is a single-chip data processor that includes CPU 112 as the CPU of system 100. CPU 112 executes stored program instructions and exchanges data with input output devices (not shown in FIG. 1). Note that as shown in FIG. 1, CPU 112 includes other functions such as caches, memory management units, and the like but for ease of discussion these are combined into CPU 112. Memory interface 120 is commonly referred to as the physical or PHY interface.

When CPU 112 performs a write cycle to memory 130, it provides address, control, and data signals to DRAM controller 114. DRAM controller 114 receives the request from CPU 112, and performs a write operation with memory 130 via interface 120. The memory write operation results in the memory location, indicated by the specified address, being updated with the data value supplied by CPU 112. The command portion of signal ADD/CMD informs memory 130 that a write operation is to be performed. Memory data strobe signal DQS identifies to memory 130 when data DQ is ready to be written into the memory.

When CPU 112 performs a read cycle to memory 130, it provides address and control signals to DRAM controller 114. DRAM controller 114 receives the request from CPU 112, and performs a read operation with memory 130 via interface 120. The command portion of signal ADD/CMD informs memory 130 that a read operation is to be performed. The read operation accesses memory 130 at the specified address and memory 130 responds by providing DRAM controller 114 with the requested data DQ and also provides data memory data strobe signal DQS which informs DRAM controller 114 that the requested data is available. After completing the read operation, DRAM controller 114 provides the requested data to CPU 112.

Memory 130 is implemented with double data rate (DDR) memory. Specifically, DRAM controller 114 supports either DDR2 or DDR3 memory. In other embodiments, DRAM controller 114 can easily be modified to support other versions of the DDR standard and other forms of DRAM. Moreover, DRAM controller 114 can also be modified to support other types of memory such as DDR static random access memory (SRAM), DDR flash memory, and the like.

According to the DDR standard, read and write transactions are performed in bursts, in which the address provided by signal ADD/CMD represents the first location of a series of sequential locations that will be read or that will be written to. Memory data strobe information conveyed by signal DQS is represented as a differential voltage waveform on two conductors. The command portion of signal ADD/CMD is used to request that a read or write transaction is to be performed, but is also used to initiate other types of operations including reset, refresh, and others, as described in the DDR standard.

Since memory 130 is a DDR memory, it transmits memory data strobe signal DQS during a read cycle nominally aligned with transitions of data signal DQ. During a write cycle, DRAM controller 114 transmits memory data strobe signal DQS nominally centered on the transitions of data signal DQ. Despite these requirements on the timing of DQS relative to DQ, the physical distance between memory 130 and microprocessor 110 and the relatively high speed of operation cause DQS to arrive at an arbitrary phase with respect to DQ. The use of DQS in this manner creates the need to individually delay the outgoing DQ and DQS signals during a write operation, and to delay the incoming DQS signals during a read operation. If DDR memory 130 uses memory chips organized as by-four ("×4") memories, then memory 130 requires the provision of two differential DQS signal pairs for each byte of data, because both DQS signal pairs must be individually delayed to match the characteristics of their respective chips. DRAM controller 114 also must generate a read-enable signal to synchronize the start of a read operation to avoid spuriously latching data before it is available. Generation of such a read enable signal also requires its own delay circuit.

The time delay required by each of the delay circuits must be individually determined. DRAM controller 114 performs a calibration procedure after power is initially supplied to data processing system 100 and reset is performed. DRAM controller 114 performs this calibration under the control of a basic input/output system (BIOS) prior to CPU 112 executing any application programs, to determine the appropriate delay values. DRAM controller 114 stores the individual delay values in registers, and these values in turn control the time delay provided by their corresponding delay circuits.

Forming all these delays requires a substantial amount of circuit area. DRAM controller 114 requires a total of five delays in order to support reading and writing each byte of data, two for the write path and three for the read path. Moreover, DRAM controller 114 supports a 64-bit wide bus with an additional eight bits of error correcting code (ECC). Thus DRAM controller 114 requires a total of forty-five separate delays. DRAM controller 116 requires the same number of delays, and this same number of delays would be required for each additional DRAM controller used.

Moreover DRAM controller 114 utilizes delay locked loop (DLL) circuits to provide these appropriate delays. Unfortunately, a DLL circuit is a very expensive component of a DRAM controller. The DLL circuit is physically large, increasing cost both due to the area of silicon involved, and due to lower manufacturing yield. Each DLL circuit also consumes significant electrical power, which ultimately limits system performance and increases operating cost. Especially because DRAM controller 114 requires five delays for each byte of data, the physical layout topology of a set of five DLL circuits is inefficient, resulting in even higher silicon area costs.

Figure 2:
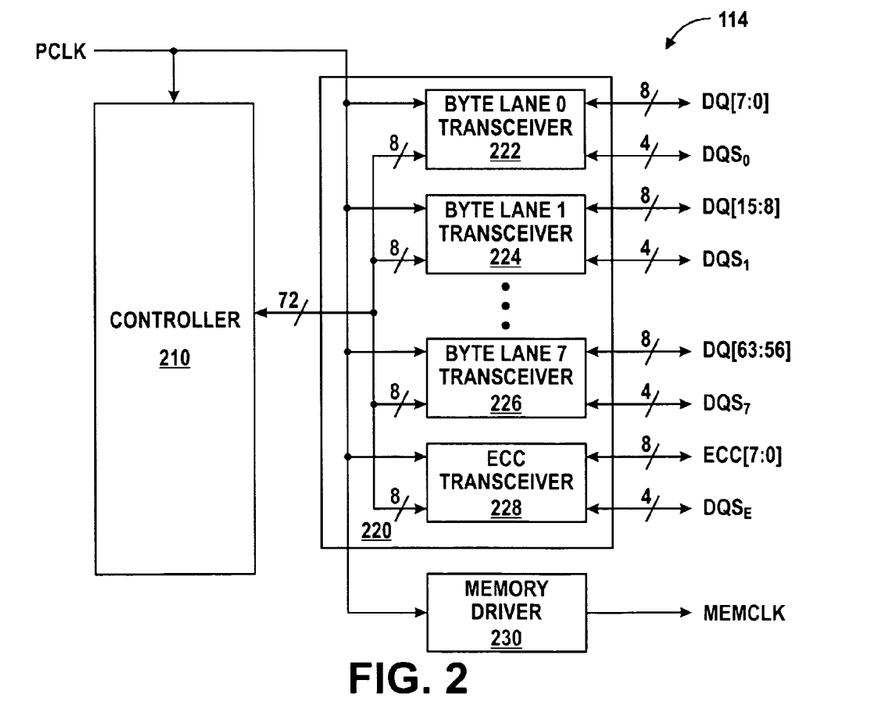
FIG. 2 illustrates in block diagram form the DRAM controller of FIG. 1.

FIG. 2 illustrates in block diagram form DRAM controller 114 of FIG. 1. DRAM controller 114 generally includes a controller 210, a transceiver 220, and MEMCLK driver 230. Controller 210 has an input for receiving a processor clock signal labeled "PCLK", a first bidirectional connection to CPU 112 (not shown in FIG. 2), and a second bidirectional connection that conducts control and data signals, including sixty-four bits of data and eight ECC bits for a total of seventy-two bits. Additional details relating to the interface between controller 210 and CPU 112 are not shown in FIG. 2.

Transceiver 220 includes eight byte-lane transceivers including representative byte-lane transceivers 222, 224, and 226, and one ECC transceiver 228. Each transceiver provides and receives eight bits of processor data through controller 210, and receives signal PCLK, and configuration data and operation commands from controller 210 (not shown in FIG. 2). Each transceiver is connected to memory interface 120 of FIG. 1 for conducting corresponding memory data and memory data strobe signals. Byte-lane transceiver 222 includes bidirectional terminals to conduct a set of memory data signals labeled "DQ[7:0]" and a set of memory data strobe signals labeled "DQS$_0$". Byte-lane transceiver 224 includes bidirectional terminals to conduct a set of memory data signals labeled "DQ[15:8]" and a set of memory data strobe signals labeled "DQS$_1$". Byte-lane transceiver 226 includes bidirectional terminals to conduct a set of memory data signals labeled "DQ[63:57]" and a set of memory data strobe signals labeled "DQS$_7$". ECC transceiver 228 includes bidirectional terminals to conduct a set of memory data signals labeled "ECC[7:0]" and a set of memory data strobe signals labeled "DQS$_E$".

MEMCLK driver 230 has an input for receiving signal PCLK, and an output for conducting memory clock signal MEMCLK.

Each of signals DQS$_{(X)}$ are implemented as two signals: an upper-nibble signal labeled "DQSU$_{(X)}$" and a lower-nibble signal labeled "DQSL$_{(X)}$." Note that DRAM controller 114 uses signal DQSU$_{(X)}$ as an upper data strobe signal if x4 DDR memory is selected, but as a data mask signal if x8 or x16 memory is selected. These signals are used within each byte-lane transceiver as single-ended signals. However during a memory write operation, these single ended signals are converted into differential signal pairs and provided to memory interface 120, and during a memory read operation, these signals are received at memory interface 120 as differential signal pairs and are converted into single-ended signals by a differential amplifier (not shown).

To understand why the appropriate timing is difficult to achieve, note DRAM memory 130 conforms to DDR standards that specify that the DDR memory transmit the requested data with the data transitions aligned with the transitioning of the memory data strobe signal that it also is transmitting. The memory interface operates at a data rate that can exceed 800 MHZ. This high speed causes relatively poor signal integrity of the incoming data signals, requiring receiver latches to capture them at a very specific point in time, somewhere near the center of the incoming data transition interval. The small portion of time that all four bits of incoming data are valid and can be captured is usually referred to as the data "eye". The width of the eye represents the period of time that the data is valid and the height of the eye represents the voltage range of the valid data. Signal integrity degradation limits the width and the height of the eye.

Moreover, one may place DDR memory on computer motherboards in any one of multiple dual inline memory module (DIMM) slots. If microprocessor 110 attempts to access a DRAM in the closest memory slot, the physical distance will cause the delay to be shorter than if microprocessor 110 attempts to access a DRAM in the farthest memory slot. In addition, different memory chips introduce variable amounts of skew between memory data signal DQ and memory data strobe signal DQS. Data processing system 100 accommodates the different skews and different distribution characteristics by training different values for the delay select signal according to which memory slot is accessed. Thus controller 210 provides the delay select values that are appropriate for all transmit (writing to memory 130) and receive (reading from memory 130) DLLs.

During the write operation, byte-lane transceiver 222 provides data signal DQ[7:0] and memory data strobe signals DQSU and DQSL with a timing relationship established by corresponding DLL circuits. Controller 210 sets an appropriate timing relationship between the transmitted data, the memory data strobe signals, and the memory clock MEMCLK so that the memory data strobe signal transition occurs centered on the interval between data signal transitions, and the timing relationships to MEMCLK, as specified in the JEDEC DDR standard, are realized. This timing relationship is determined through a calibration procedure performed by the BIOS after power is initially supplied to the system and reset is performed.

Figure 3:
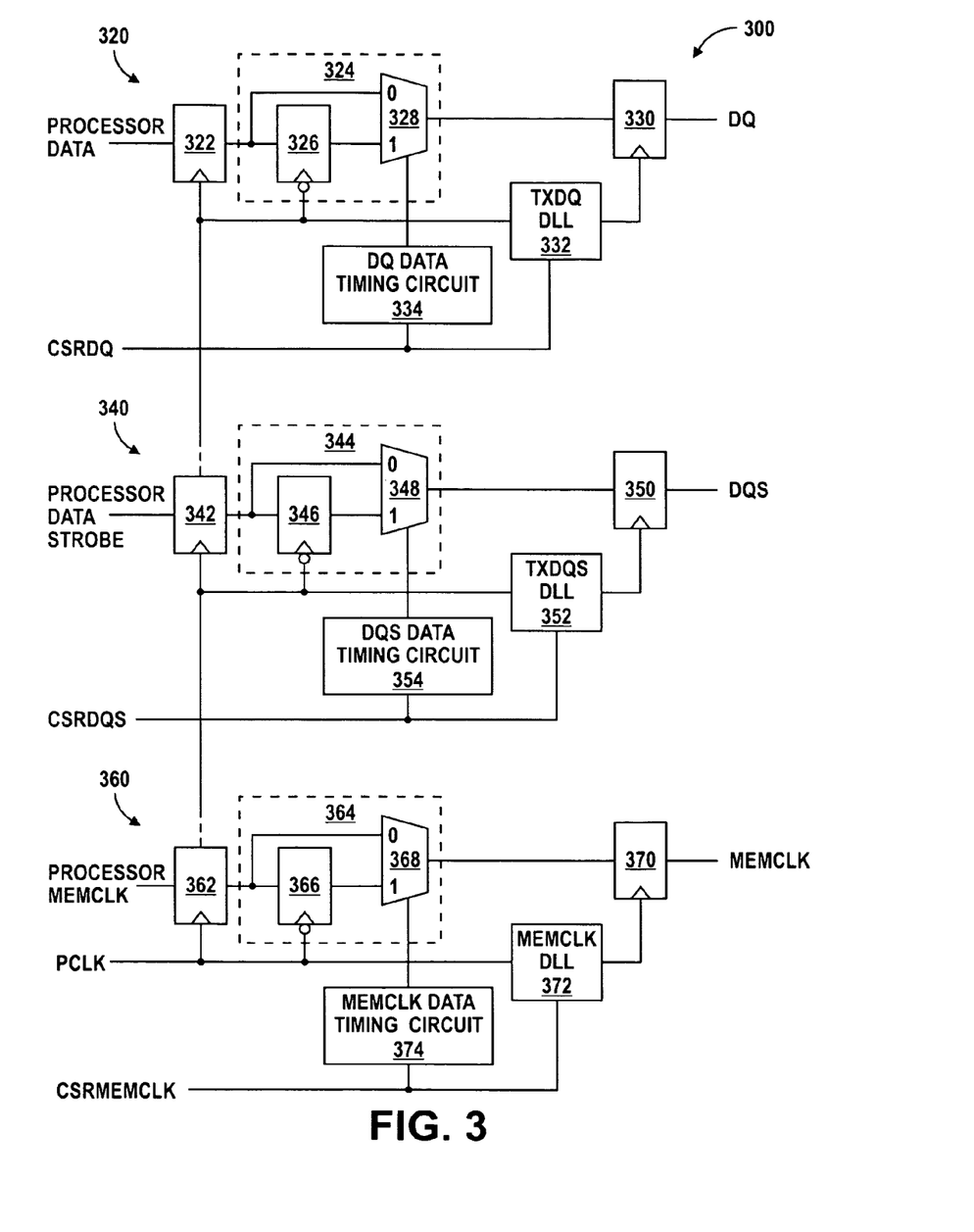
FIG. 3 illustrates in block diagram form a portion of the DRAM controller of FIG. 1 providing flexible launch delays.

FIG. 3 illustrates in block diagram form a portion 300 of DRAM controller 114 of FIGS. 1 and 2, including portions of byte-lane transceiver 222 and MEMCLK driver 230. Portion 300 includes a DQ driver circuit 320, a DQS driver circuit 340, and a MEMCLK driver circuit 360.

DQ driver circuit 320 includes a first latch 322, an extension logic circuit 324, a second latch 330, a TXDQ DLL 332, and a DQ data timing circuit 334. Latch 322 has a data input for receiving signal labeled "PROCESSOR DATA", a clock input for receiving PCLK, and an output. Extension logic circuit 324 includes a latch 326 and a multiplexer 328. Latch 326 has a data input connected to the output of latch 322, a negative-edge-responsive clock input for receiving PCLK, and an output. Multiplexer 328 has a first input connected to the output of latch 322, a second input connected to the output of latch 326, a select input, and an output. Latch 330 has a data input connected to the output of multiplexer 328, a clock input, and an output for providing signal DQ. TXDQ DLL 332 has a clock input connected to PCLK, a delay selection input for receiving signal labeled "CSRDQ", and an output connected to the clock input of latch 330. DQ data timing circuit 334 has an input for receiving delay selection signal CSRDQ, and an output connected to the select input of multiplexer 328.

DQS driver circuit 340 includes a first latch 342, an extension logic circuit 344, a second latch 350, a TXDQ DLL 352, and a DQS data timing circuit 354. Latch 342 has a data input for receiving signal labeled "PROCESSOR DATA STROBE", a clock input for receiving PCLK, and an output. Extension logic circuit 344 includes a latch 346 and a multiplexer 348. Latch 346 has a data input connected to the output of latch 342, a negative-edge-responsive clock input for receiving PCLK, and an output. Multiplexer 348 has a first input connected to the output of latch 342, a second input connected to the output of latch 346, a select input, and an output. Latch 350 has a data input connected to the output of multiplexer 348, a clock input, and an output for providing signal DQS. TXDQS DLL 352 has a clock input connected to PCLK, a delay selection input for receiving signal labeled "CSRDQS", and an output connected to the clock input of latch 350. DQS data timing circuit 354 has an input for receiving delay selection signal CSRDQS, and an output connected to the select input of multiplexer 328.

MEMCLK driver circuit 360 includes a first latch 362, an extension logic circuit 364, a second latch 370, a MEMCLK DLL 372, and a MEMCLK data timing circuit 374. Latch 362 has a data input for receiving signal labeled "PROCESSOR MEMCLK", a clock input for receiving PCLK, and an output. Extension logic circuit 364 includes a latch 366 and a multiplexer 368. Latch 366 has a data input connected to the output of latch 362, a negative-edge-responsive clock input for receiving PCLK, and an output. Multiplexer 368 has a first input connected to the output of latch 362, a second input connected to the output of latch 366, a select input, and an output. Latch 370 has a data input connected to the output of multiplexer 368, a clock input, and an output for providing signal MEMCLK. MEMCLK DLL 372 has a clock input connected to PCLK, a delay selection input for receiving signal labeled "CSRMEMCLK", and an output connected to the clock input of latch 370. MEMCLK data timing circuit 374 has an input for receiving delay selection signal CSRMEMCLK, and an output connected to the select input of multiplexer 368.

Signals DQ, DQS, and MEMCLK are provided to memory interface 120 via corresponding line driver circuits, not shown in FIG. 3.

During a memory write operation, latch 322 receives and latches processor data on the rising edge of PCLK. Latch 322 represents a first-in-first-out (FIFO) data buffer wherein a data pointer selects which data is to be provided to memory interface 120. Latch 326 of extension logic circuit 324 again latches the output of latch 322 on the subsequent falling edge of PCLK. Multiplexer 328 of extension logic circuit 324 selects either the output of latch 322 or the output of latch 326, depending on the control signal provided by DQ data timing circuit 324. If the control signal is in a logic low state, then multiplexer 328 selects data from latch 322. If the control signal is in a logic high state, then multiplexer 328 selects data from latch 326. The data provided by latch 326 is the same as that provided by latch 322, but is delayed by approximately one half of one PCLK cycle time. Latch 330 re-latches the data that is provided by multiplexer 328 on the rising edge of the retiming clock signal received from TXDQ DLL 332. Thus latch 330 operates as a re-timing latch. TXDQ DLL 332 provides a delayed version of PCLK, in which the magnitude of the delay is specified by signal CSRDQ. TXDQ DLL 332 provides a selected one of thirty-two unique delays, ranging from $0/32^{nd}$ (no delay) to $31/32^{nd}$ of a PCLK cycle time. It should be appreciated that whereas a DLL with 32 delay cells is described, other numbers of delay cells can be utilized thereby providing a different fractional delay resolution.

In order for a latch to successfully acquire the data value provided on its input, the timing of the data, with respect to the timing of the latch clock, must satisfy the data setup and data hold requirements of the particular latch. Because the delay provided by TXDQ DLL 332 can vary from zero to nearly an entire PCLK cycle time, it is impossible to satisfy the setup and hold time requirements of latch 330 if only the data at the output of latch 322 were available. However DQ driver circuit 320 ensures that both setup and hold times are satisfied by selectively delaying the output of latch 322 by an amount equal to approximately one-half of one cycle of PCLK. DQ data timing circuit 334 receives the same delay selection signal that is provided to TXDQ DLL 332 and decodes it to configure extension logic circuit 324 to select a data source which will satisfy the setup and hold timing requirements of latch 330. The timing diagram of FIG. 4 will further illustrate the operation of DQ circuit 320 and more particularly extension logic circuit 324 and DQ data timing circuit 334.

The operation of each of DQS driver circuit 340 and MEMCLK driver circuit 360 is similar to the operation of DQ driver circuit 320 previously described. Furthermore, extension logic circuit 324 is utilized any time that a circuit clocked by PCLK interfaces to a retiming latch that is clocked by a DLL. This includes the circuit implementing the transmit ADDR/CMD signal as well as the circuit implementing the read-enable signal used by the receive logic. It should be appreciated that the delay provided by extension logic circuit 324 will vary depending on individual circuit timing considerations. Whereas a delay of approximately one-half of a PCLK cycle is illustrated, it will be appreciated that any other delay, from nearly zero up to and even exceeding a full PCLK cycle of delay can be provided. While extension logic circuits 324, 344, and 364 provide delayed data by use of latches 326, 346, and 366, other techniques for introducing delay can be utilized in other embodiments, such as by an analog delay provided by one or more logic gates. Similarly, data timing circuits 334, 354, and 374 can utilize other criteria to construct the control signals respectively provided to extension logic circuits 324, 344, and 364. It should be appreciated that while DLL circuits 332, 352, and 372 provide a preferred means to create the retiming clock signals, other circuits that provide variable or fixed delay can be used.

To operate with different DDR memories occupying different DIMM slots, DRAM controller independently selects the timing (launch) delay of DQ, DQS, and MEMCLK. Data timing circuits 334, 354 and 374, in combination with extension logic circuits 324. 344, and 364, prevent re-timing latches 330, 350, and 370 from losing synchronization with the output data stream despite varying retiming clock delays provided by DLLs 332, 352, and 372. Furthermore, the delays provided by DLLs 332, 352, and 372 can be modified "on the fly" without losing synchronization with the output data stream. The functionality described is particularly useful when it is employed to provide unique launch delays dependent on which memory DIMM slot is being addressed. This technique can be used to increase the number of DIMM slots that can be addressed by each DRAM interface channel as well as improving the overall memory writing data rate and performance.

Using re-timing latches to provide the necessary delay allows the digital section of the physical interface (PHY) to be synchronous to the globally deskewed PCLK source. This insures that the data driven off the die is in a deterministic state, improving silicon test procedures. The use of re-timing latches is thus preferred compared to an alternative solution of using the DLL output clock to access the FIFO data buffer.

Figure 4:
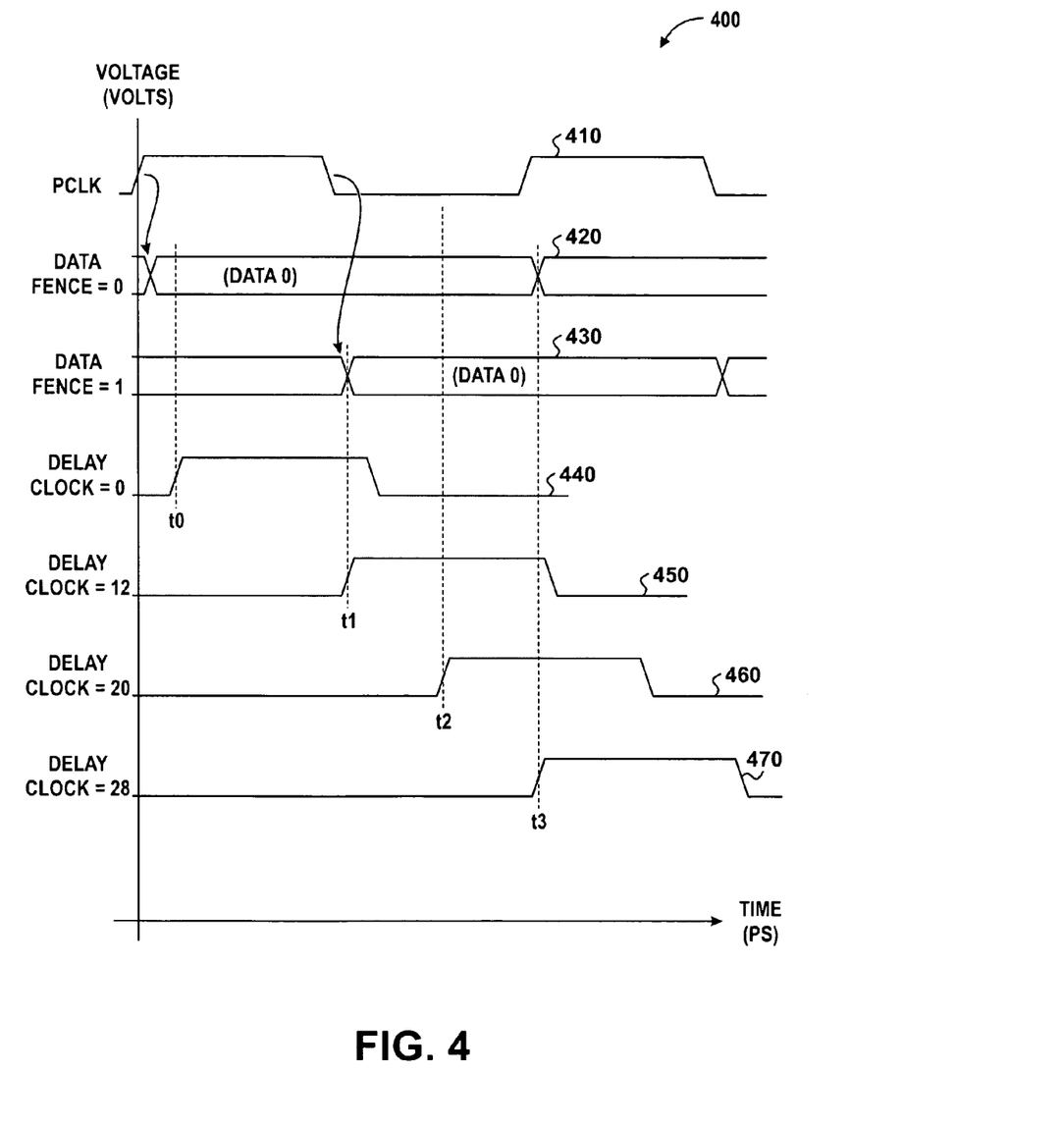
FIG. 4 illustrates a timing diagram useful in understanding the operation of the portion of the DRAM controller of FIG. 3.

FIG. 4 illustrates a timing diagram useful in understanding the operation of the portion of DRAM controller 114 illustrated in FIG. 3. In FIG. 4, the horizontal axis represents time in picoseconds (ps), and the vertical axis represents voltage in volts for each of set of signals. Waveform 410 represents PCLK. Waveform 420, labeled "DATA FENCE=0" represents the output of extension logic circuit 324 of FIG. 3 in response to an active low control signal provided by DQ data timing circuit 334. Waveform 430, labeled "DATA FENCE=1" represents the output of extension logic circuit 324 of FIG. 3 in response to an active high control signal provided by DQ data timing circuit 334. Waveform 440, labeled "DELAY CLOCK=0", represents the output of TXDQ DLL 332 when delay selection signal CSRDQ assumes a value of zero. Waveform 450, labeled "DELAY CLOCK=12" represents the output of TXDQ DLL 332 when delay selection signal CSRDQ assumes a value of 12. Waveform 460, labeled "DELAY CLOCK=20" represents the output of TXDQ DLL 332 when delay selection signal CSRDQ assumes a value of 20. Waveform 470, labeled "DELAY CLOCK=28" represents the output of TXDQ DLL 332 when delay selection signal CSRDQ assumes a value of 28.

A rising edge of PCLK 410 generates a transition on waveform 420. One half of a PCLK cycle later, PCLK falls, and generates a transition on waveform 430. Waveform 430 represents the same data value (DATA0) as was provided by waveform 420, but delayed by one half of a PCLK cycle. Waveforms 440, 450, 460, and 470 represent four of the thirty-two possible delays that can be provided by TXDQ DLL 332. The four DLL delay values were chosen to illustrate boundary conditions in which the setup or hold time requirements of re-timing latch 330 are not satisfied. If the low-to-high transition of waveform 470 were used to latch the undelayed data of waveform 420 (time $t_3$), then the data hold time requirements of re-timing latch 330 would be violated. This clock however can safely acquire the correct data value (DATA0) by using the delayed data of waveform 430. If the low-to-high transition of waveform 450 were used to latch the delayed data of waveform 430 (time $t_1$), then the data setup time requirements of re-timing latch 330 would be violated. This clock however can safely acquire the correct data value (DATA0) by using the non-delayed data of waveform 420. Intrinsic delays in the generation of the clock provided to re-timing latch 330 (primarily insertion delay provided by TXDQ DLL 332), guarantee that the setup requirements of re-timing latch 330 are met if DELAY CLOCK=0 440 is used to acquire DATA FENCE=0 420. At time $t_2$ the low-to-high transition of waveform 460 can be used to safely acquire either the non-delayed data of waveform 420 or the delayed data of waveform 430.

Based on this analysis, DQ data timing circuit 334 sets its control signal output to a logic zero if the delay selection value represented by signal CSRDQ is less than twenty, thereby configuring extension logic 324 to provide the non-delayed data signal (waveform 420) to re-timing latch 330. DQ data timing circuit 334 sets its control signal output to a logic one if the delay selection value represented by signal CSRDQ is greater than or equal to twenty, thereby configuring extension logic 324 to provide the delayed data signal (waveform 430) to re-timing latch 330. The delay select value threshold at which DQ data timing circuit 334 changes the state of its control output can vary depending on specific implementation and timing requirements.

The driver circuits disclosed herein are particularly useful in DRAM controllers. However they may be used in other types of circuits as well. For example, they may be useful in future generations of DRAMs that may require additional signal timing precision.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A dynamic random access memory (DRAM) controller with a data driver circuit comprising:
    a first latch having an input for receiving a processor data signal, a clock input for receiving a processor clock signal, and an output;
    an extension logic circuit having an input coupled to said output of said first latch, a control input for receiving a control signal, and an output, wherein said extension logic circuit delays said input selectively in response to said control signal;
    a second latch having an input coupled to said output of said extension logic circuit, a clock input for receiving a second clock signal, and an output for providing an output signal: and
    a data timing, circuit having an input for receiving a first delay line select signal, and an output for providing said control signal, wherein said data timing circuit activates said control signal to cause said extension logic circuit to delay said input by substantially one-half of a period of said processor clock signal when said first delay line select signal is greater than a predetermined value.

2. The DRAM controller of claim 1, wherein said output signal is characterized as being a memory data signal.

3. The DRAM controller of claim 2, further comprising:
    a data strobe driver having an input for receiving said processor clock signal, a delay input for receiving a second delay line select signal, and an output for providing a data strobe signal; and
    a memory clock driver having an input for receiving a processor clock signal, a delay input for receiving a third delay line select signal, and an output for providing a memory clock signal.

4. The DRAM controller of claim 1, wherein said output signal is characterized as being a memory clock signal.

5. The DRAM controller of claim 1, wherein said extension logic circuit has a clock input for receiving said processor clock signal, and delays said output of said first latch by an amount substantially equal to one-half of a period of said processor clock signal selectively in response to said control signal.

6. The DRAM controller of claim 5, wherein said extension logic circuit comprises:
    a third latch having an input coupled to said input of said extension logic circuit, an inverting control input for receiving said first clock signal, and an output; and
    a multiplexer having a first input coupled to said input of said extension logic circuit, a second input coupled to said output of said third latch, a control input for receiving said control signal, and an output coupled to said output of said extension logic circuit.

7. The DRAM controller of claim 1, further comprising:
a first delay locked loop (DLL) having a clock input for receiving said processor clock signal, a delay input for receiving said first delay line select signal, and an output coupled to said clock input of said second latch for providing said second clock signal.

8. The DRAM controller of claim 7, further comprising:
a second DLL having an input for receiving said processor clock signal, a delay input for receiving a second delay line select signal, and an output; and
a third latch having an input for receiving an input data strobe signal, a clock input coupled to said output of said second DLL, and an output for providing an output data strobe signal.

9. The DRAM controller of claim 1, wherein said first latch, said extension logic circuit, and said second latch form part of a first transceiver, and the DRAM controller comprises a plurality of additional transceivers.

10. The DRAM controller of claim 1, wherein said output signal is characterized as being a data strobe signal.

11. A data driver comprising:
a first latch having an input for receiving an input data signal, a clock input for receiving a first clock signal, and an output;
an extension logic circuit having an input coupled to said output of said first latch, a control input for receiving a control signal, and an output, wherein said extension logic circuit selectively delays said output of said first latch in response to said control signal;
a second latch having an input coupled to said output of said extension logic circuit, a clock input for receiving a second clock signal, and an output for providing an output data signal; and
a data timing circuit an output for providing said control signal, wherein said data timing circuit activates said control signal to cause said extension logic circuit to delay said input thereof when a delay line select signal is greater than a predetermined value.

12. The data driver of claim 11, wherein said extension logic circuit further has a clock input for receiving said first clock signal, and delays said output of said first latch by an amount substantially equal to one-half of a period of said first clock signal selectively in response to said control signal.

13. The data driver of claim 12, wherein said extension logic circuit comprises:
a third latch having an input coupled to said input of said extension logic circuit, an inverting clock input for receiving said first clock signal, and an output; and
a multiplexer having a first input coupled to said input of said extension logic circuit, a second input coupled to said output of said third latch, a control input for receiving said control signal, and an output coupled to said output of said extension logic circuit.

14. The data driver of claim 11, further comprising:
a delay locked loop (DLL) having an input for receiving said first clock signal, a delay input for receiving said delay line select signal, and an output coupled to said clock input of said second latch for providing said second clock signal.

15. The data driver of claim 11, wherein said output data signal comprises a signal selected from a group consisting of a memory data signal, a data strobe signal, and a memory clock signal.

16. A method comprising:
latching data in response to a first clock signal to provide latched data;
selectively delaying said latched data in response to a control signal to provide selectively delayed data;
re-latching said selectively delayed data in response to a second clock signal; and
activating said control signal when a delay line select signal is greater than a predetermined value.

17. The method of claim 16,
wherein said delay line select signal is further configured to determine a phase relationship between said first clock signal and said second clock signal.

18. The method of claim 16, wherein said selectively delaying comprises:
selectively delaying said latched data for substantially one-half of a cycle of said first clock signal.

19. The method of claim 16, wherein said generating said second clock signal comprises:
generating said second clock signal by delaying said first clock signal according to said delay line select signal.

20. The method of claim 16, wherein said selectively delayed data comprises data selected from a group consisting of processor data, a data strobe, and a memory clock.

* * * * *

UNITED STATES PATENT AND TRADEMARK OFFICE
CERTIFICATE OF CORRECTION

| | | |
|---|---|---|
| PATENT NO. | : 7,872,937 B2 | Page 1 of 1 |
| APPLICATION NO. | : 12/059641 | |
| DATED | : January 18, 2011 | |
| INVENTOR(S) | : Shawn Searles et al. | |

It is certified that error appears in the above-identified patent and that said Letters Patent is hereby corrected as shown below:

Column 10, Line 34, please change "a data timing," to --a data timing--

Column 11, Line 37, change "a data timing circuit an output" to --a data timing circuit having an output--

Signed and Sealed this

Eighteenth Day of October, 2011

David J. Kappos
*Director of the United States Patent and Trademark Office*